United States Patent [19]

Compter

[11] Patent Number: 4,616,165
[45] Date of Patent: Oct. 7, 1986

[54] SINGLE-PHASE RELUCTANCE MOTOR

[75] Inventor: Johan C. Compter, Hoogeveen, Netherlands

[73] Assignee: U.S. Philips Corporation, New York, N.Y.

[21] Appl. No.: 725,882

[22] Filed: Apr. 22, 1985

[30] Foreign Application Priority Data

Apr. 26, 1984 [NL] Netherlands .................. 8401336

[51] Int. Cl.⁴ .............................................. H02P 1/42
[52] U.S. Cl. .................................... 318/701; 318/798
[58] Field of Search ............... 318/701, 798, 254, 138, 318/439

[56] References Cited

U.S. PATENT DOCUMENTS

| | | | |
|---|---|---|---|
| 3,679,953 | 7/1972 | Bedford | 318/701 |
| 4,348,619 | 9/1982 | Ray et al. | 318/254 |
| 4,409,324 | 10/1983 | Nielsen et al. | 318/254 |
| 4,532,460 | 7/1985 | Gale et al. | 318/139 |
| 4,563,622 | 1/1986 | Deavers et al. | 318/254 |

Primary Examiner—David Smith, Jr.
Attorney, Agent, or Firm—Robert T. Mayer; Bernard Franzblau

[57] ABSTRACT

A single-phase reluctance motor in which the excitation pulse timings and lengths are controlled as a function of the speed by means of, in particular, a microprocessor; mechanical provisions are made in order to ensure reliable starting of the motor and special starting pulses are generated by means of a simple motor-position sensor which generates two pulses per revolution.

14 Claims, 18 Drawing Figures

SINGLE-PHASE RELUCTANCE MOTOR

This invention relates to a single-phase reluctance motor having a stator provided with an excitation coil and an iron rotor which is constructed in such a way that the flux which is coupled to the excitation coil depends on the rotor position.

Reluctance motors and in particular single-phase reluctance motors have the special advantage that they can be manufactured cheaply. However, this advantage is outweighed by the disadvantages of a poor starting performance and complex control.

From the article by P. J. Lawrenson et.al. IEE Proc., Vol. 127, Pt.B No. 4, July 1980, pages 253–265 it is known to control reluctance motors with three or more phases by electronic means which generate energizing pulses of a length and timing which varies as a function of the speed, utilizing a comparatively intricate rotor-position sensor.

An object of the invention is to provide a single-phase reluctance motor with speed-dependent control of the pulse timing and length by means of a simple position sensor and with a substantially improved starting performance.

To this end the invention is characterized by
permanent-magnet means for obtaining a preferential stationary position from which starting in a desired direction is possible,
a position sensor for generating position pulses at diametrically opposite rotor positions,
a switch for energizing the excitation coil under command of energizing pulses,
means for generating a first energizing pulse of predetermined length in order to start the motor,
means for generating at least a second energizing pulse after the appearance of the first position pulse during starting, which pulse starts a predetermined time interval after the appearance of said position pulse and has a predetermined length,
means for determining the time interval between consecutive position pulses,
means for determining, after starting, a measure of a first and of a second time interval as a function of the time intervals measured between consecutive position pulses, and
means for supplying energizing pulses which each start when the first time interval has elapsed since the appearance of a position pulse and which are each sustained for the second time interval.

The two-pulses-per-revolution position sensor enables control to be simplified because the energizing pulses are each preceded by a position pulse and the number of position pulses is not larger than the number of energizing pulses per revolution. By measuring the time interval between consecutive position pulses a measure of the speed is obtained. Since this requires the occurrence of at least two position pulses there are provided at least two starting pulses.

A single-phase reluctance motor in accordance with the invention may further comprise a motor-current sensor for detecting the current through the excitation coil and generating a signal when said current exceeds a predetermined value, and means for opening the switch for a predetermined time under command of said signal.

A single-phase reluctance motor in accordance with the invention may also be characterized in that the motor is constructed to return the field energy stored in the excitation coil to the power supply when the switch is open.

A preferred embodiment may be characterized in that an energy-recovery coil is arranged in series with a diode, which series arrangement is connected in parallel with the series combination of the excitation coil and the switch. The energy-recovery coil is coupled magnetically to the excitation coil in an opposite sense so that, after the switch has been opened, current will flow in the energy-recovery coil in a direction opposite to the direction of the current in the excitation coil.

With respect to the said means a preferred embodiment of the invention may be characterized further in that said means comprise a microprocessor and the position sensor is coupled to an interrupt input of the microprocessor. Using an interrupt input for the position pulses is found to be a very good choice, yielding a program structure which can allow for various disturbances of the normal motor operation in a simple manner.

This preferred embodiment may be characterized further by a first program step in which a signal on the interrupt input is awaited for a predetermined time in order to ascertain whether or not the rotor rotates and to generate said first and second energizing pulses if the rotor does not rotate.

A further characteristic feature of this preferred embodiment may be a program step in which the presence of a signal on the interrupt input when the switch is in the closed state is detected in order to reduce said second time interval.

A further characteristic feature of this embodiment may be a program step which ascertains whether the time which has elapsed after the appearance of a signal on the interrupt input is longer than a predetermined time in order to generate said first and second energizing pulses if said time is longer. Another feature may be that in the microprocessor program a flag is set as a function of the position in the program in order to mark at least that period in the program where the appearance of a signal on the interrupt input is anticipated, which flag is tested after every occurrence of a signal on the interrupt input.

With respect to the control of the timing and lengths of the excitation pulses as a function of the speed, a single-phase reluctance motor in accordance with the invention may be characterized in that said means for determining, after starting, first and second time intervals as a function of the time intervals measured between consecutive position pulses comprise selection means for selecting between at least a first function, in which the first and the second time intervals decrease as a function of the speed or the inverse of the time intervals measured, and a second function, in which said first and second time intervals decrease more rapidly as a function of the speed.

In this way the motor can be operated in accordance with a selected one of a plurality of torque-speed curves.

The invention will now be described in more detail, by way of example, with reference to the drawings, in which.

Figures 1, 2, 3:
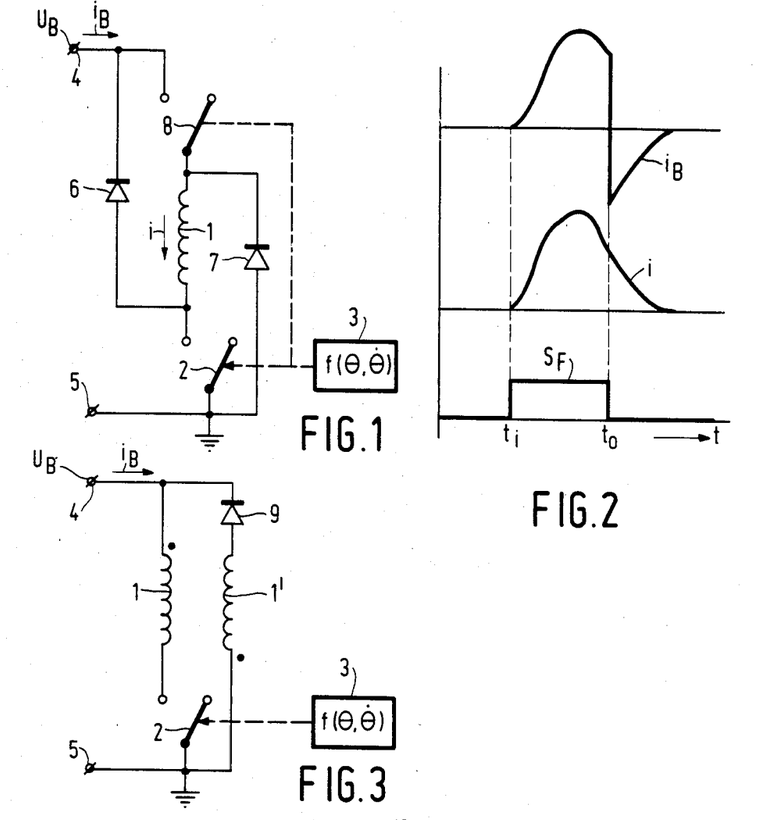
FIG. 1 shows the circuit diagram of the control circuit of a single-phase reluctance motor.
FIG. 2 shows some diagrams illustrating the operation of the control circuit shown in FIG. 1.
FIG. 3 shows an alternative to the control circuit shown in FIG. 1.

FIG. 1 shows the circuit diagram of a controlled single-phase reluctance motor. This motor comprises a stator coil 1 which is actuated by a circuit 3 as a function of the rotor position ($\theta$) and rotor speed ($\dot{\theta}$) to connect the stator coil 1 to, or to disconnect it from, a source of supply voltage $U_B$. In order to ensure that after disconnection of the stator coil the magnetic-field energy decreases in such a way that energy is recovered and switching transients are avoided, that side of the stator coil which is connected to the switch 2 is connected to the positive power-supply terminal 4 via a diode 6 and the other side of the stator coil is connected to the negative power-supply terminal 5 via a diode 7 and also to the positive power-supply terminal 4 via a switch 8 which is actuated in synchronism with the switch 2. An alternative embodiment without energy recovery is obtained if the switch 8 and the diodes 6 and 7 are dispensed with and a voltage limiter is arranged across the switch 2.

When the switches 2 and 8 are closed, current will flow from terminal 4 to ground 5 via the stator coil 1. After the two switches 2 and 8 have been opened the current in coil 1 is initially sustained via diodes 6 and 7 in the reverse direction with respect to the power supply, so that energy is recovered. Switch 8 ensures that no current can flow in the circuit formed by the diode 6 in parallel with the stator coil 1.

FIG. 2 shows the switching function $S_F$ as a function of time t and the current i in the stator coil and the current $i_B$ in the power-supply terminal 4. At the instant $T_i$ the switches are closed and the currents i and $i_B$ begin to flow. If the switches open at the instant $t_o$ the current i continues to flow in the same direction until it has become zero. However, at this instant ($t_o$) the direction of the current $I_B$ is reversed so that the magnetic field energy in coil 1 is returned.

FIG. 3 shows a modification to the control system shown in FIG. 1. The switch 8 and the diodes 6 and 7 are now dispensed with. Instead, the coil 1 together with a coil 1' are arranged on the stator in the form of two coupled coils, for example by the use of a bifilar winding. Coil 1' in series with a diode 9 is arranged between the power-supply terminals 4 and 5 and is wound oppositely in comparison with coil 1. As a result of this, the field energy present in coil 1 and consequently in coil 1' which is coupled thereto, at the instant that switch 2 opens is drained in that a current begins to flow from power-supply terminal 5 to power-supply terminal 4 via coil 1' and diode 9. In comparison with the system shown in FIG. 1 this saves one switch and one diode at the expense of an additional winding.

Figure 4:
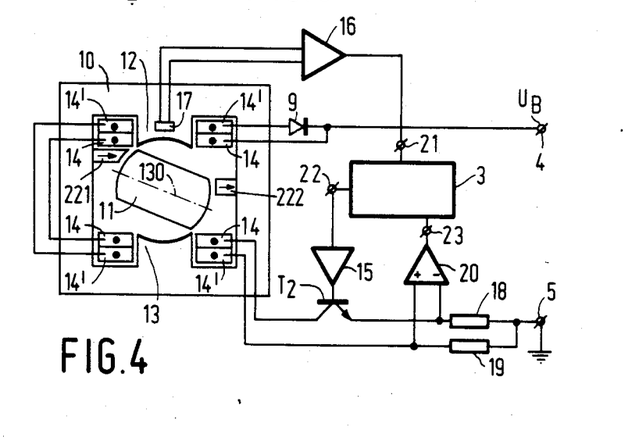
FIG. 4 shows a single-phase reluctance motor using the control circuit shown in FIG. 3 in more detail.

FIG. 4 shows a single-phase reluctance motor with the control system of FIG. 3 shown in more detail. The motor comprises a stator assembly 10 which has an internal recess for a rotor 11 and which terminates in two poles 12 and 13 around which a winding 14, 14' constituting the coils 1 and 1' is arranged. The rotor 11 is an iron rotor which also comprises two poles. The windings 14, 14' are connected as shown in the diagram of FIG. 3, the switch 2 being constituted by a transistor $T_2$ which is controlled by the control circuit 3 via an amplifier 15.

Every revolution of the rotor the control circuit 3 receives two position pulses from a detector 17 via an amplifier 16. The control circuit 3 also receives a signal which is a measure of the current which flows in the windings 14, 14'.

This signal is obtained by arranging measuring resistors 18 and 19 in series with the coils 14 and 14', respectively. The voltage across these resistors is applied to an amplifier 20, which yields a signal which is a measure of the current through coil 14 and, after switch 2 ($T_2$) has been opened, of the current through coil 14'. The different directions of the currents in the two coils present no problems because the amplifier 20 is a differential amplifier.

Since the rotor of a single-phase reluctance motor may assume a position from which it cannot be started, magnets 221 and 222 are provided in order to ensure that the rotor, when it is stationary, assumes a predetermined position from which starting in the desired direction is possible. A well-defined stationary position is obtained in that the magnets 221 and 222 have a width which is comparatively small with respect to the width of the rotor poles and in that they are arranged asymmetrically on the same side of the axis of symmetry 130 of the rotor.

In the present embodiment the rotor-position sensor 17 is of a type which supplies pulses at predetermined opposite rotor positions, i.e. two pulses per revolution. This sensor may be an optical sensor comprising a diametrically slotted disc which is coupled to the rotor and which revolves between a light source and a light detector, or it may be a magnetic sensor comprising a diametrically magnetized disc which is coupled to the rotor and which revolves past a Hall element. Two pulses per revolution have been selected because two energizing pulses per revolution are generated in the case of a single-phase reluctance motor (comprising two poles).

The control circuit 3 may be constructed to determine the rotor speed from the time interval between consecutive sensor pulses and, as a function of this speed, to determine the switch-on duration ($T_b$) of the switch 2 and the rotor position at which switch 2 is closed, expressed as a time $T_a$ which has elapsed after every sensor pulse.

Figure 5:
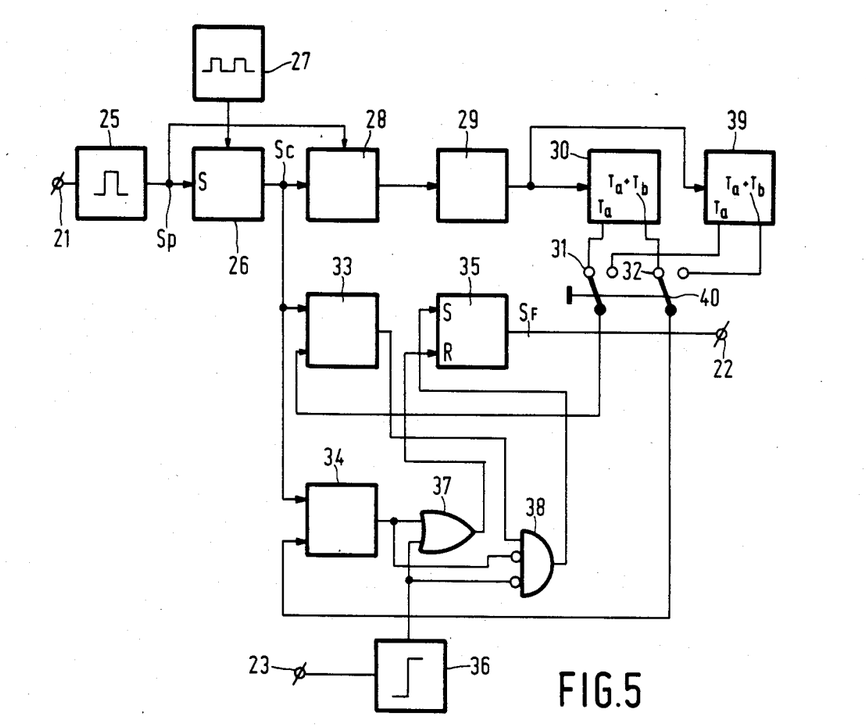
FIG. 5 is a block diagram illustrating the principle of the control circuit 3 in FIGS. 3 and 4.

FIG. 5 shows an example of the control circuit 3. This circuit comprises an input 21 which is connected to the output of the amplifier 16 (FIG. 4) and to a pulse shaper 25 which shapes the sensor signal supplied by the amplifier 16 into pulses $S_p$. These pulses reset and start a counter 26, which receives a counting signal from a pulse generator 27. By means of a sample-and-hold circuit 28 the count $S_c$ of the counter 26 is sampled under command of the sensor pulses just before the counter 26 is reset. The content of the sample-and-hold circuit 28 is therefore always a measure of the time interval between consecutive sensor pulses or a measure of the motor speed. An address generator 29 derives an address for a memory circuit 30 which stores the time intervals $T_a$ and $T_b$ as a function of the speed in the form of a table from the contents of said sample-and-hold circuit. These time intervals $T_a$ and $(T_a+T_b)$, the latter being the time between the appearance of a sensor pulse and the end of an energizing pulse, appear on outputs 31 and 32 of this memory.

The count of the counter 26, which is a running measure of the time elapsed after the appearance of a sensor pulse, is transferred to comparators 33 and 34 which compare this time interval with the time intervals $T_a$ and $T_a+T_b$ read from the memory 30. At the instant at which this count corresponds to the read-out time $T_a$ a flip-flop 35 is set. The flip-flop is reset at the instant at which the count corresponds to the time $T_a+T_b$. The output signal of this flip-flop is applied to an output 22 which is connected to the switching transistor $T_2$ (FIG. 4) via the amplifier 15 (FIG. 4).

Figure 6:
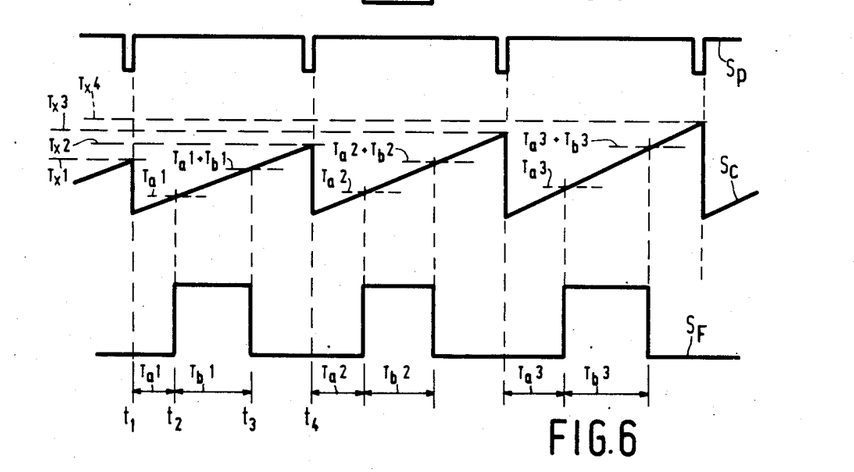
FIG. 6 shows some diagrams to illustrate the operation of the control circuit shown in FIG. 5.

The above operation will be explained with reference to FIG. 6, in which $S_p$ is the sensor-pulse signal on the output of the pulse shaper 25, $S_C$ represents the count of the counter 26, and $S_F$ is the output signal of flip-flop 35. At an instant $t_1$ a sensor pulse appears. At this instant the count of the counter is $T_{X1}$. The time intervals $T_{a1}$ and $T_{b1}$ are determined as a function of the count $T_{X1}$. At the instant $t_2$ the counter 26 reaches a count $T_{a1}$ and the flip-flop is set and at instant $t_3$ it reaches a count corresponding to $T_{a1}+T_{b1}$, after which the flip-flop is reset. At the instant $t_4$ another sensor pulse appears. The count is then $T_{X2}$ and is utilized in order to read out the new time intervals $T_{a2}$ and $T_{a2}+T_{b2}$.

The circuit shown in FIG. 5 further comprises an input 23 which receives the current-measuring signal from the amplifier 20 (FIG. 4). When this signal, has an excess value, a pulse is derived by means of a comparator 36, which pulse is combined with the output signal of the comparator 34 via an OR-gate 37 and resets the flip-flop 35. The ouput signal of the comparator 36 is also combined with the output signal of the comparator 33 via the inverting input of an AND-gate 38 to set the flip-flop 35 at the end of an excess-current signal, if this is within the energizing pulse defined by the comparators 33 and 34, for which purpose the output signal of the comparator 34, in addition to the output signal of the comparator 33, is applied to the AND-gate via an inverting input.

The circuit shown in FIG. 5 enables the behaviour of the motor to be adapted to different uses by employing several memories with different contents in order to obtain different torque-speed curves. FIG. 5 therefore shows a second memory 39 which is also controlled by the address circuit 29. By means of a switch 40 it is possible to choose the time intervals $T_a$ and $T_a+T_b$ obtained from the memory 30 or 39.

The circuit shown in FIG. 5 may be provided with, inter alia, a circuit for testing whether the rotor has stalled, a circuit for starting the motor, and protection circuits.

Figure 7:
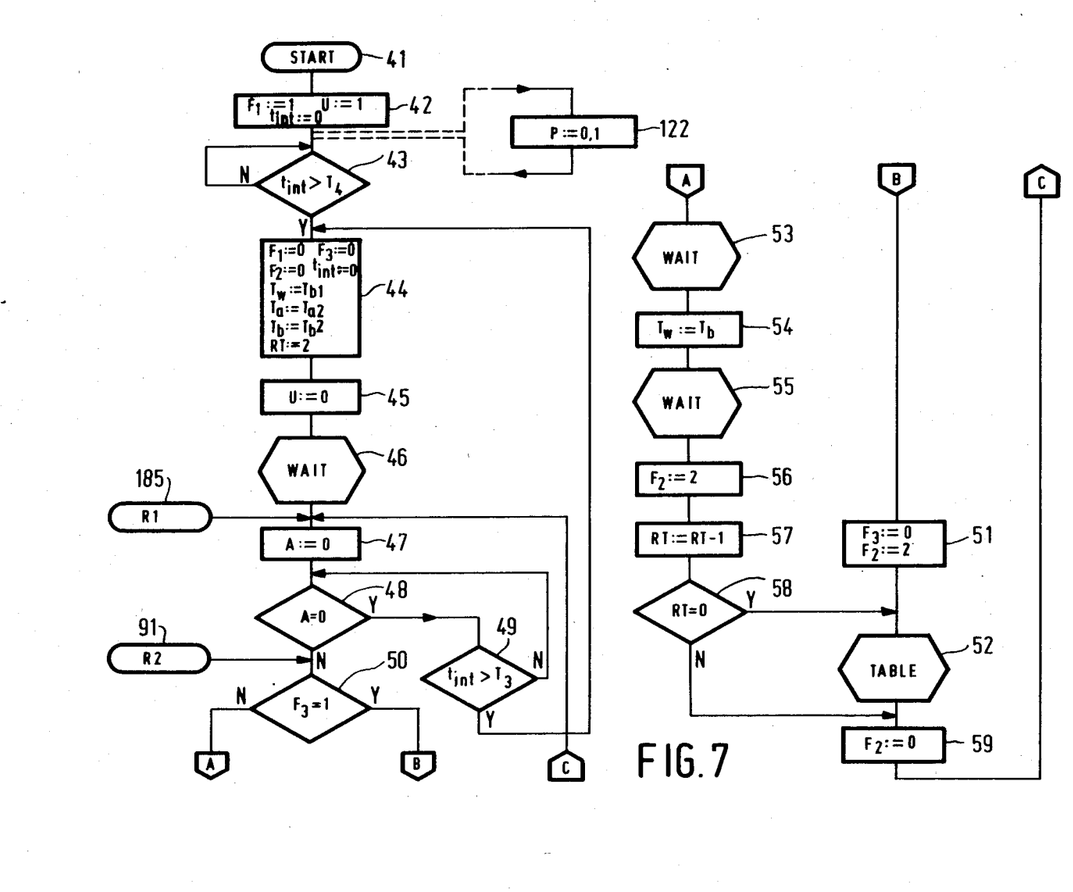
FIG. 7 is a flow-chart of a program for implementing the control circuit 3 in FIGS. 3 and 4 by means of a microprocessor.

The control circuit described with reference to FIG. 5 is very suitable for implementation by means of a microprocessor. For this purpose FIG. 7 shows a flow chart of a suitable program for such a microprocessor, associated flow charts being shown in FIGS. 8, 9 and 10. The flow chart is based on a microprocessor control system where the sensor pulse is applied to an interrupt input. A pulse on the interrupt input causes the program in progress to be interrupted. This interrupt starts an interrupt subroutine in which inter alia the reading of an internal clock (timer) is determined, which timer is reset so as to establish the time interval relative to the preceding sensor pulse. The timing of this process is shown in FIG. 11 in which $S_F$ is the energizing signal and $S_p$ the sensor-pulse signal. At an instant $t_1$ a sensor pulse appears and the time interval $T_{x(n)}$ which has elapsed since the preceding sensor pulse is determined in the interrupt subroutine. At the end ($t_2$) of the next energizing pulse the processor computes new values for the intervals $T_a$ and $T_b$ during a time $T_{c(n+1)}$. Subsequently, the processor waits for a time T until the instant ($t_3$) at which a new time interval $T_{x(n+1)}$ is defined by receipt of a new sensor pulse. Then a waiting time $T_{a(n+2)}$, determined during the computing time $T_{c(n+1)}$, is observed and subsequently an output pulse is supplied during the time $T_{b(n+2)}$ determined in said time interval $T_{c(n+1)}$. After this, the next values of $T_a$ and $T_b$ can be computed. However, in the present embodiment this is not effected after every sensor pulse but with a frequency which depends on the rotor speed. The computed values of $T_a$ and $T_b$ consequently relate to the penultimate time interval $T_x$ measured or to an interval measured even earlier.

The program starts in block 41 labelled START. Subsequently, in block 42 the timer $t_{int}$ for measuring the time interval $T_x$ between two interrupts is set to zero ($t_{int} := 0$), the initial state of the switch is defined as open ($U := 1$) and a flag $F_1$ is set to 1 ($F_1 := 1$) as a sign that the program is in the starting phase of the motor. Subsequently, it is ascertained whether the motor actually has to be started or is already running. For this purpose, the reading of the timer $T_{int}$ is compared with a predetermined time interval $T_4$, for example 100 msecs, in block 43 and if the timer has not reached this reading the program returns to a point before block 43. This means that in fact a waiting time of 100 msecs. is observed. If in the meantime an interrupt (i.e. a sensor pulse) occurs this means that the motor is already running and the program proceeds to another point in the flow chart via the interrupt subroutine, which will be described hereinafter. If no interrupt occurs, which means that the motor is not running, the program proceeds to block 44 after said 100 msecs have elapsed to establish initial values for $T_a$, $T_b$. An initial value, which is the length assigned to the first starting-energizing pulse in the WAIT subroutine, is defined for $T_w$. As the program proceeds the quantity $T_w$ (which in general defines a waiting time) assumes values $T_a$ and $T_b$. In addition, a parameter RT is set to 2. The function of this parameter will be explained hereinafter. Further, some flags are set. Flag $F_1$ is reset ($F_1 := 0$) as a sign that the 100 msec. start test has been executed. A flag $F_2$ is set to zero ($F_2 := 0$) as a sign that an interrupt is anticipated (since a starting pulse will be generated). Further, a flag $F_3$ is set to zero ($F_3 := 0$). This flag, whose function will be explained hereinafter, is set ($F_3 := 1$) when the TABLE subroutine is to be carried out. After these initializations the parameter U is set to zero ($U := 0$) in block 45, $U = 1$ meaning the motor coil is not energized and $U = 0$ meaning that the motor coil is energized Thus, the starting pulse begins in this block. Subsequently, the WAIT subroutine is called in block 46, which will be described in more detail hereinafter and in which a waiting time $T_w$, which has been set to an initial value in the initialization block 44 is observed, after which U is set to 1 to terminate the starting pulse. Subsequently, a parameter A is set to zero (A:=0) in a block 47. This parameter is employed to halt the program until an interrupt occurs. For this purpose it is ascertained in block 48 whether A is zero. If it is zero, the program returns to block 48 via a waiting loop in block 49. The program remains in this loop until an interrupt has appeared because the parameter A is set to one in the interrupt subroutine, which will be explained hereinafter. However, it may happen that waiting in this loop continues, which means that the starting pulse is not capable of starting the motor or that the motor has stalled for some reason. In block 49 the elapsed time $t_{int}$, which has been reset at the beginning of the starting pulse in block 44 ($t_{int}$: =0), is therefore compared with a predetermined time $T_3$. If this elapsed time exceeds said time $T_3$ the program is branched to the input of block 44 via output Y of block 49 in order to generate a new starting pulse and re-initialize the various flags and parameters. IF A has become 1 during this loop owing to completion of the interrupt subroutine after the occurrence of an interrupt, the program proceeds to block 50, bearing in mind that the waiting time $T_w$ has been set to equal $T_a$ in the interrupt subroutine, which will be described hereinafter, which value $T_a$ has been initialized in block 44. In block 50 it is ascertained whether flag $F_3$ is 1. If this is the case, said flag is reset and flag $F_2$ is set ($F_2$:=2) in block 51, and the TABLE subroutine must be executed because the instantaneous values of $T_a$ and $T_b$ are considered not to be in conformity with the motor speed, after which the TABLE subroutine is called in block 52 to set new values for $T_a$ and $T_b$. However, in the present stage of the starting phase $F_3$ is zero because it has been set to zero in the initializing block 44, so that the program proceeds from the block 50 to block 53 via output N to carry out the WAIT subroutine, in the present case with $T_w = T_a$ (set during the interrupt in the loop around block 48). Thus, a waiting time $T_a$ is observed from the interrupt pulse until the instant that the energizing pulse begins. The parameter U is then also inverted at the end of this subroutine, which in the present case means that U:=0. Subsequently, in block 54 the time $T_w$ is set to equal $T_b$ (the value initialized in block 44 at this instant of the program) and subsequently the WAIT subroutine is called in block 55 to obtain a waiting time $T_w$ before the parameter U is inverted again. In this way an energizing pulse of a length $T_w$ is generated.

Figure 12:
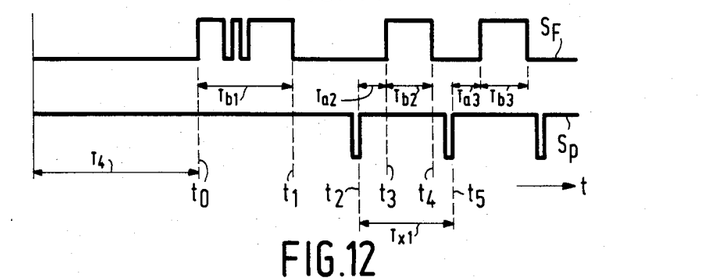

The part of the program executed during the starting of the motor and described in the foregoing will be explained with reference to FIG. 12, which shows the interrupt signal or sensor pulses $S_p$ and the energizing signal $S_F$. Waiting is effected for a time $T_4$ (for example 100 msecs) until the instant $t_o$. Then the starting pulse is generated for a time $T_{b1}$ which is determined by the value of $T_w$ initialized in the initialization block 44. At the instant $t_1$, i.e. after the time interval $T_w = T_{b1}$ has elapsed, the starting pulse terminates. At the instant $t_2$ the first sensor pulse appears and a waiting time $T_w = T_{a2}$ is observed, after which the next energizing pulse begins which is sustained for a time $T_w = T_{b2}$. In the meantime the program has reached block 56 where flag $F_2$ is set to 2 ($F_2$:=2), which means that a TABLE subroutine is carried out. However, before this is effected the parameter RT (set to 2 in block 44) is decremented by one in block 57 and is compared with zero in block 58. If RT is zero, a jump is made to block 52 via output Y, in which block the TABLE subroutine is started. However, this is not yet the case at the instant of starting. In this block RT becomes one so that the program proceeds to output N of block 58 and subsequently back to the beginning of block 47 via block 59, where $F_2$ is again set to zero because the TABLE subroutine has not been called. The same operations are then performed with the initialized values of $T_a$ and $T_b$ causing (see FIG. 12) another pulse of a length $T_{b3} = T_b$ to be generated after a time $t_{a3} = T_a$ has elapsed after the second interrupt (an interval between two interrupts being determined for the first time), after which upon arrival at block 58 the value of the parameter RT becomes equal to zero and consequently in block 52 the TABLE subroutine is called in order to generate new values for $T_a$ and $T_b$ as a function of the interval $T_{x1}$ which has been determined in the meantime. After this subroutine in block 52 flag $F_2$ is set to zero in block 59 as a sign that the TABLE subroutine has been completed and the program returns to the input of block 47. Thus, the program continues to generate energizing pulses with a starting delay $T_a$ and a length $T_b$ which is obtained as a function of the interval time $T_x$ via the TABLE subroutine.

Figure 8:
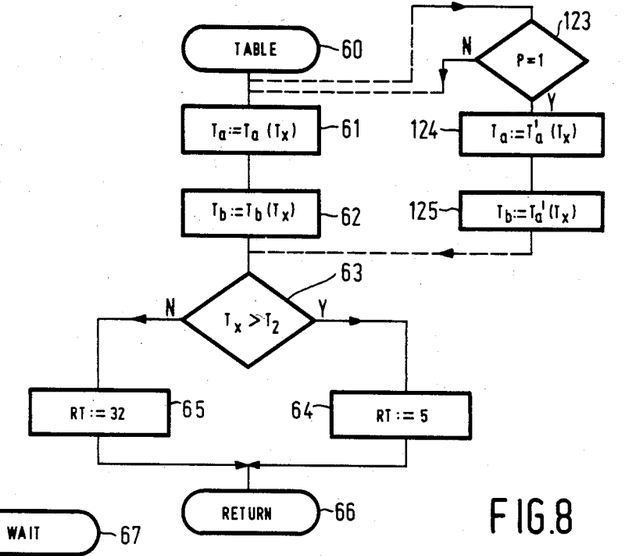
FIGS. 8, 9 and 10 are three flow-charts of subroutines in the flow-chart shown in FIG. 7, FIG. 11 to 15 show some diagrams to explain the program structure.

FIG. 8 shows said TABLE subroutine, which starts in the block 60 labelled TABLE. In block 61 $T_a$ is determined as a function of $T_x$ ($T_a := T_a(T_x)$) and in block 62 $T_b$ is determined as a function of $T_x$ ($T_b := T_b(T_x)$). This is possible by reading tables stored in memories as a function of $T_x$ or by means of algorithms or a combination of the two (interpolation between tabulated values). Subsequently, in block 63 the interval time is compared with a predetermined time $T_2$ ($T_x > T_2$) to determine whether the speed has exceeded a specific value. If said time is longer or the speed is lower than this limit value, the parameter RT is set to, for example, 5 (RT:=5) in block 64, so that the values found for $T_a$ and $T_b$ are used five times. If the time is not longer or the speed is higher, the parameter RT is set to, for example, 32 in block 65 because at higher speeds the computing speed of the microprocessor is too low to calculate new values for $T_a$ and $T_b$ with a very high frequency. Via block 66 labelled RETURN the microprocessor returns to the main program, i.e. to the output of block 52), after which, in the manner described in the foregoing, an energizing pulse with the values found for $T_a$ and $T_b$ is generated 5 or 32 times, depending on the value to which RT has been set, after every interrupt or every sensor pulse.

Figure 9:
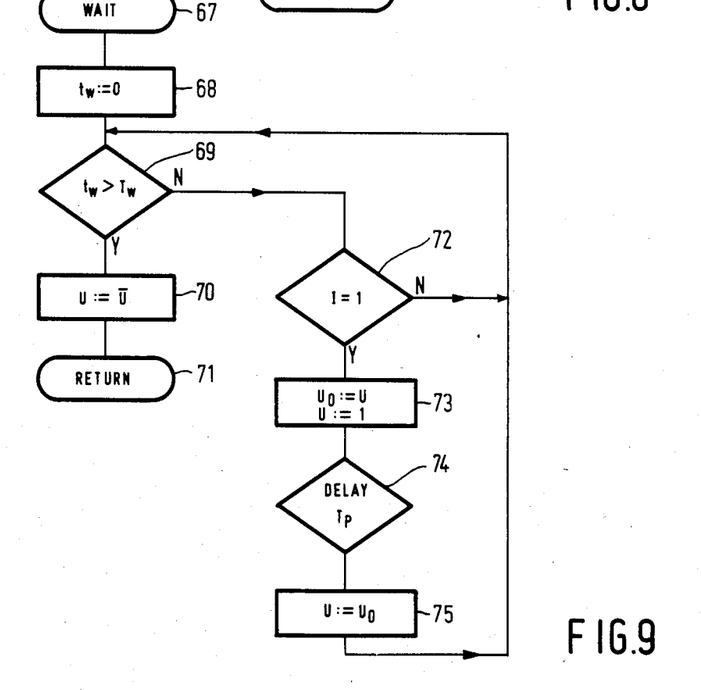

FIG. 9 shows the flow chart of the WAIT subroutine. The subroutine begins with block 67 labelled "WAIT". Subsequently, a clock (timer) $t_w$ is set to zero in block 68. Then the program proceeds to a loop around block 69, which it leaves when $t_w > T_w$, which is equal to $T_a$ or $T_b$ depending on the place in the program, has been observed. When this is the case (output Y of block 69) the switch connected in series with the motor coil is changed over (U:=$\overline{U}$) in block 70 and subsequently the command "RETURN" in block 71 causes a return to a point in the main program where the WAIT subroutine has been called (block 46, 53 or 55).

The WAIT subroutine includes an excess-current protection. If the current in the motor coil becomes excessive the switch 2 (FIG. 3) must be opened. This check is carried out during the time $T_b$, i.e. during the time that the program is in the waiting loop around block 69. Conversely, switch 2 should not be closed at the instant at which the current in the parallel coil 1' (FIG. 3) has become too large because this excessive current is then taken over by coil 1. For this purpose it is ascertained in block 72 whether the excess-current signal I (obtained via amplifier 20 in FIG. 4) is one (I=1). If this is not the case (N), there is no excess current in the coils and the program returns to block 69. If it is (Y), the program proceeds to block 73 in order to note the instantaneous position of the switch by means of a parameter $U_o$ ($U_o$:=U) and to open the switch (U:=1). Subsequently, a waiting time $T_p$, for example 50 µsecs, is observed in block 74 and then switch 2 is reset to the original position (U:=$U_o$) in block 75 and the program returns to block 69.

Figure 10:
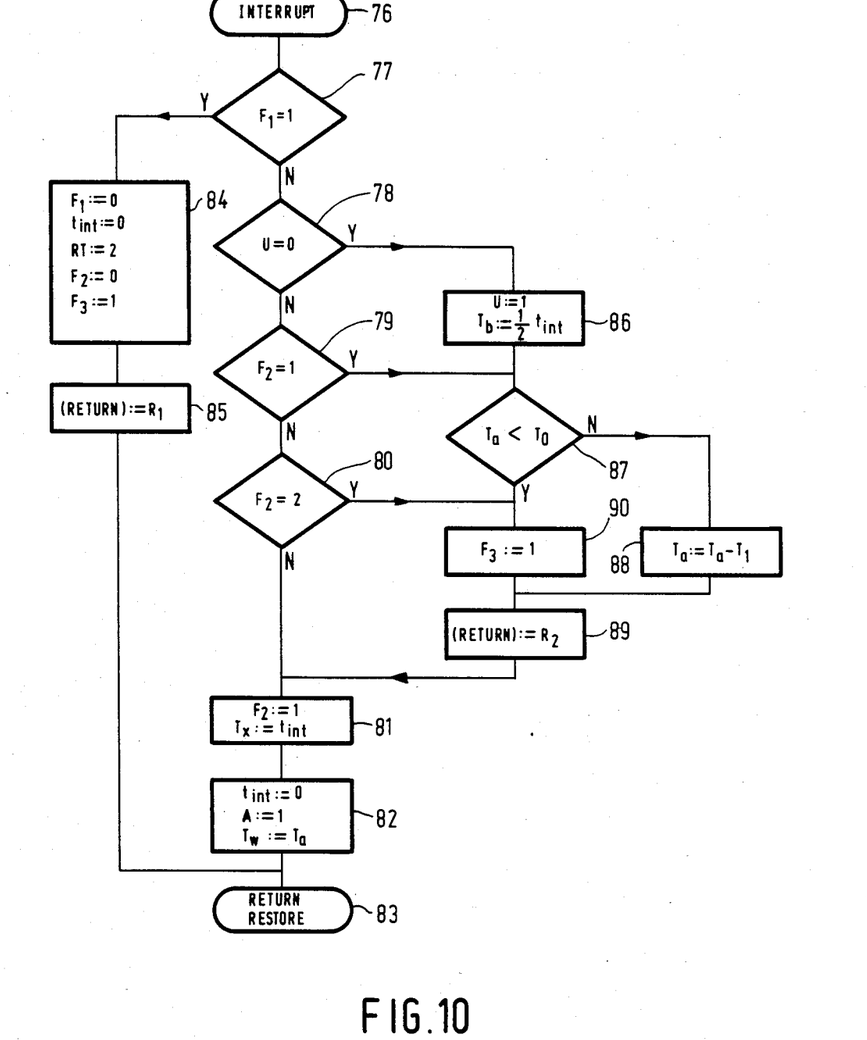
Figure 11:
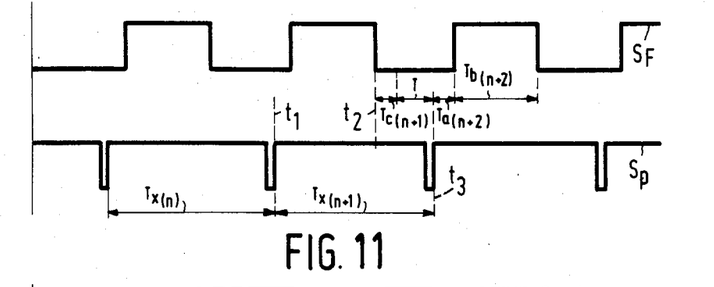

FIG. 10 shows the INTERRUPT subroutine. Since the subroutine is called by an external signal, it always has priority over the program which is in progress at the instant at which the interrupt appears. Upon the occurrence of an interrupt, the point where the program is interrupted is stored to enable this program to be continued by means of a "RETURN RESTORE" command upon termination of the interrupt. Since the INTERRUPT subroutine may be called at various points in the main program it is important to know where this has happened. For this purpose flag $F_2$ is always set in the main program. $F_2=0$ means that the interrupt occurs during a period in which said interrupt is awaited. $F_2=1$ means that the interrupt occurs in a period in which it is not anticipated. This is mainly during the WAIT subroutine. $F_2=2$ means that the interrupt occurs during the TABLE subroutine. Flag $F_1=1$ means that an interrupt occurs during the start-test phase (block 43 in the main program) and the condition U=0 means that an interrupt appears when switch 2 is closed (FIG. 3). Therefore, said conditions must be tested in the INTERRUPT subroutine. The program commences in block 76 labelled "INTERRUPT". Subsequently, in blocks 77, 78, 79 and 80 the conditions $F_1=1$, U=0, $F_2=1$ and $F_2=2$ are tested in this order, the sequence being completed if the answer to a test is always no (N). If all the answers are no (N), the program proceeds normally, (i.e. no special conditions have occurred and the interrupt was anticipated in the waiting loop around block 48 of the main program. In block 81 flag $F_2$ is then set to 1, which means that after this no interrupt is anticipated. Moreover, the time $T_x$ is set to equal the timer reading $t_{int}$ or to equal the time interval elapsed since the last interrupt. Subsequently, in block 82 the timer $t_{int}$ is reset ($t_{int}$:=0), the parameter A is set to 1 (A:=1), which parameter interrupts the waiting loop around block 48 of the main program, and the next waiting time $T_w$ is set to $T_a$. The RETURN RESTORE command in block 83 results in a return to the original point in the main program.

Figure 13:
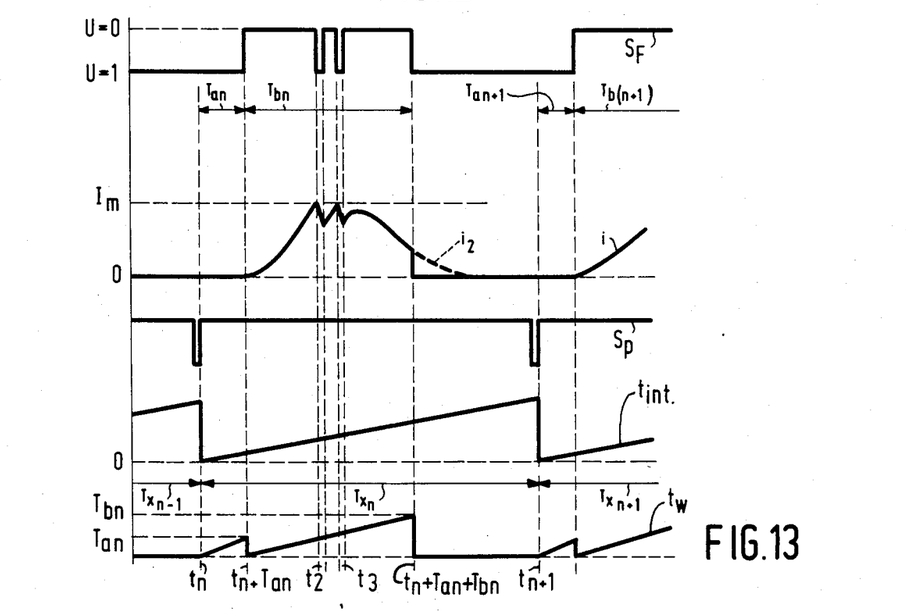

The normal execution of the program after the starting phase is illustrated by means of the diagrams in FIG. 13, which show the energizing signal $S_F$, the motor current i, the sensor pulses (=interrupt signal) $S_p$, the reading of the interrupt timer $t_{int}$, and the reading of the waiting timer $t_w$. At an instant $t_n$ an interrupt occurs. The reading of the interrupt timer $t_{int}$ is taken over, yielding the interval time $T_{x(n-1)}$ from which the times $t_{a(n+1)}$ and $T_{b(n+1)}$ are derived. Subsequently, the waiting timer $t_w$ and the interrupt timer $t_{int}$ are reset and a waiting time $T_{an}$ is observed until the instant $t_n+T_{an}$ where the waiting timer reading $t_w$ is equal to $T_{an}$. Then the switch is closed (U:=0) and the waiting timer $t_w$ is reset. Subsequently, a waiting time $T_{bn}$ is observed. If at instants $t_2$ and $t_3$ the motor current i reaches the maximum $I_m$, the switch is opened each time for a specific time. At the instant $t_n+T_{an}+I_{bn}$, when the waiting timer indicates the time $T_{bn}$, the switch is opened again (U:=1) and the waiting timer is set to zero. The motor current i then becomes zero, the current $i_2$ then begins to flow in the coil 14' as is indicated by the broken line $i_2$ in FIG. 13, and the corresponding time intervals $T_{an+1}$ and $T_{bn+1}$ are determined as a function of the time $T_{x(n-1)}^{or}$ are made equal to the preceding time intervals $T_{an}$ and $T_{bn}$, depending on the parameter RT. Subsequently, another interrupt is awaited at the instant $t_{n+1}$, after which the time $T_{xn}$ is set to equal the reading of the timer $t_{int}$.

If during the INTERRUPT subroutine in FIG. 10 the condition $F_1=1$ is found in block 77, this means that the motor is already running during starting of the main program. The program then proceeds to block 84. In this block $F_1$ is set to zero ($F_1$:=0t as a sign that the start-test phase has terminated, the interrupt timer $t_{int}$ is set to zero ($t_{int}$:=0) in order to measure the first interval $T_x$; the parameter RT is set to 2 (RT:=2), which is the lowest value because the motor speed is still unknown; the flag $F_2$ is set to zero ($F_2$:=0) to indicate that an interrupt is awaited, and the flag $F_3$ is set to 1 ($F_3$:=1) as an indication that the TABLE subroutine must be carried out in the main program immediately after the next interrupt, in order to determine the parameters $T_a$ and $T_b$ when the first interval time $T_x$ is known. Subsequently, the RETURN address is set to $R_1$ and the program returns to input $R_1$ of the main program via block 83, i.e. to block 85 at the beginning of the waiting loop around block 48.

If the condition U=0 is found, this means that an interrupt has occurred with switch 2 in the closed condition. The program then proceeds to block 8, where the parameter U is set to 1 (U:=1) in order to open the switch and, moreover, the next pulse length is set to be equal to half the interval which has elapsed at this instant ($T_b$:=½ $t_{int}$) in order to preclude the occurrence of another interrupt during the next energizing pulse. This situation may occur during acceleration of the motor. Subsequently, it is ascertained in block 87 whether the waiting time $T_a$ is smaller than a predetermined value $T_O$, for example 1.28 ms. If not, this time is reduced by an amount $T_1$ in block 88 in order to ensure that the waiting time is reduced in step with the motor acceleration, and subsequently the program proceeds to block 89. If the value of the time interval $T_a$ is smaller than that of the time $T_O$, $T_a$ is not reduced and $F_3$ is set to one in block 90 as a sign that the TABLE subroutine must be executed immediately in order to determine the values of $T_a$ and $T_b$ again as a function of the measured interval time $T_x$. The program then proceeds to block 89 which makes the return adress equal to $R_2$ (RETURN:=$R_2$), after which, via blocks 81, 82 and 83, which have already been described, the program proceeds to block 91 in the main program where subsequently the flag $F_3$ is tested in block 50. If $F_3=1$, the TABLE subroutine is performed and the next interrupt is awaited so that one energizing pulse is skipped.

Figure 14:
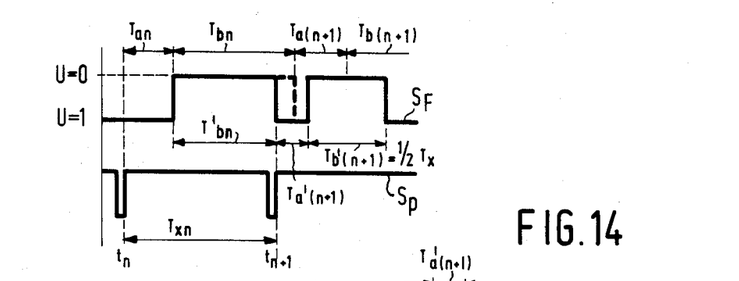

FIG. 14 illustrates the program sequence in the case of an interrupt during an energizing pulse (U=0). The figure shows the signal $S_F$ (=Ū) and the sensor-pulse signal (=interrupt signal) $S_p$. At an instant $t_n$ an interrupt occurs and the interrupt timer $t_{int}$ is started. The values $T_{an}$ and $T_{bn}$ for the next period have already been determined. A waiting time $T_{an}$ is observed, after which the switch 2 is closed. After a time $T_{bn}'$, which is shorter than the time $T_{bn}$, i.e. during the energizing pulse, the next interrupt occurs. The energizing pulse is discontinued immediately and the interval time $T_x$ is determined. A new time $T_{a(n+1)}'$ (which is equal to the original time $T_{a(n+1)}$ or smaller depending on the result of the test in block 87 of the interrupt program) and a new time $T_{b(n+1)}'$, which is set to $\frac{1}{2} T_{xn}$, are determined to take the place of the times $T_{a(n+1)}$ and $T_{b(n+1)}$ set originally.

By checking whether $F_2=1$ block 79 ascertains whether the interrupt has occurred during the computing time $T_c$ of the program, i.e. not during the TABLE subroutine. If the test is true (Y) the program proceeds to block 87 and is completed in the same way as described for the occurrence of an interrupt during the energizing pulse, so that if the condition $T_a<T_O$ in block 87 is not fulfilled (output N of block 87) the time $T_a$ is reduced but the pulse length $T_b$ is not reduced.

Figure 15:
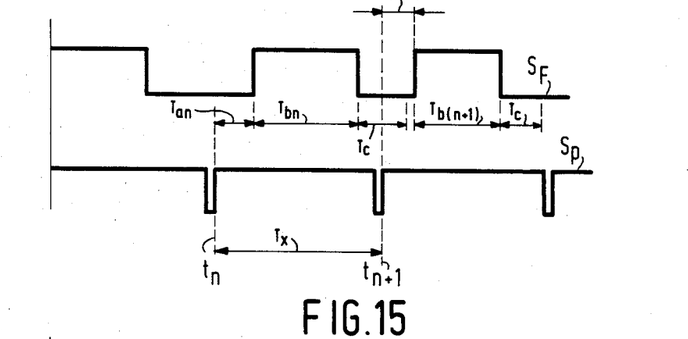

FIG. 15 illustrates the program sequence in this situation by means of the signals $S_F$ and $S_p$. At an instant $t_n$ a sensor pulse (=interrupt pulse) occurs and a waiting time $T_{an}$ is observed, after which an energizing pulse is produced during a time $T_{bn}$. Then the program requires a time $T_c$ for the normal execution of this program, part of which, depending on the value of RT, is utilized for the TABLE subroutine. At the instant $t_{n+1}$ an interrupt pulse occurs during said time $T_c$. Via the interrupt subroutine and the return to address $R_2$ the program is in fact accelerated by no longer carrying out the time-consuming TABLE subroutine and consequently a reduced waiting time $T'_{a(n+1)}$ is observed, after which an energizing pulse of predetermined length $T_{b(n+1)}$ is supplied. If the time $T_{a(n+1)}$ is not reduced in this program in response to the test in block 87, the times $T_a$ and $T_b$ are determined immediately as a function of the measured interval time by means of the TABLE subroutine via flag $F_3:=1$.

If the test in block 80 shows that the interrupt has appeared during the TABLE subroutine, the TABLE subroutine is executed immediately via block 90.

Thus, in the various different situations described in the foregoing appropriate new values are formed for $T_a$ and $T_b$, which new values are used to 32 times depending on the instantaneous value of the parameter RT. Under specific conditions, specifically if the interrupt occurs during the TABLE subroutine, the program proceeds immediately with this TABLE subroutine in order to find new and more accurate values for the parameters $T_a$ and $T_b$.

Figure 16:
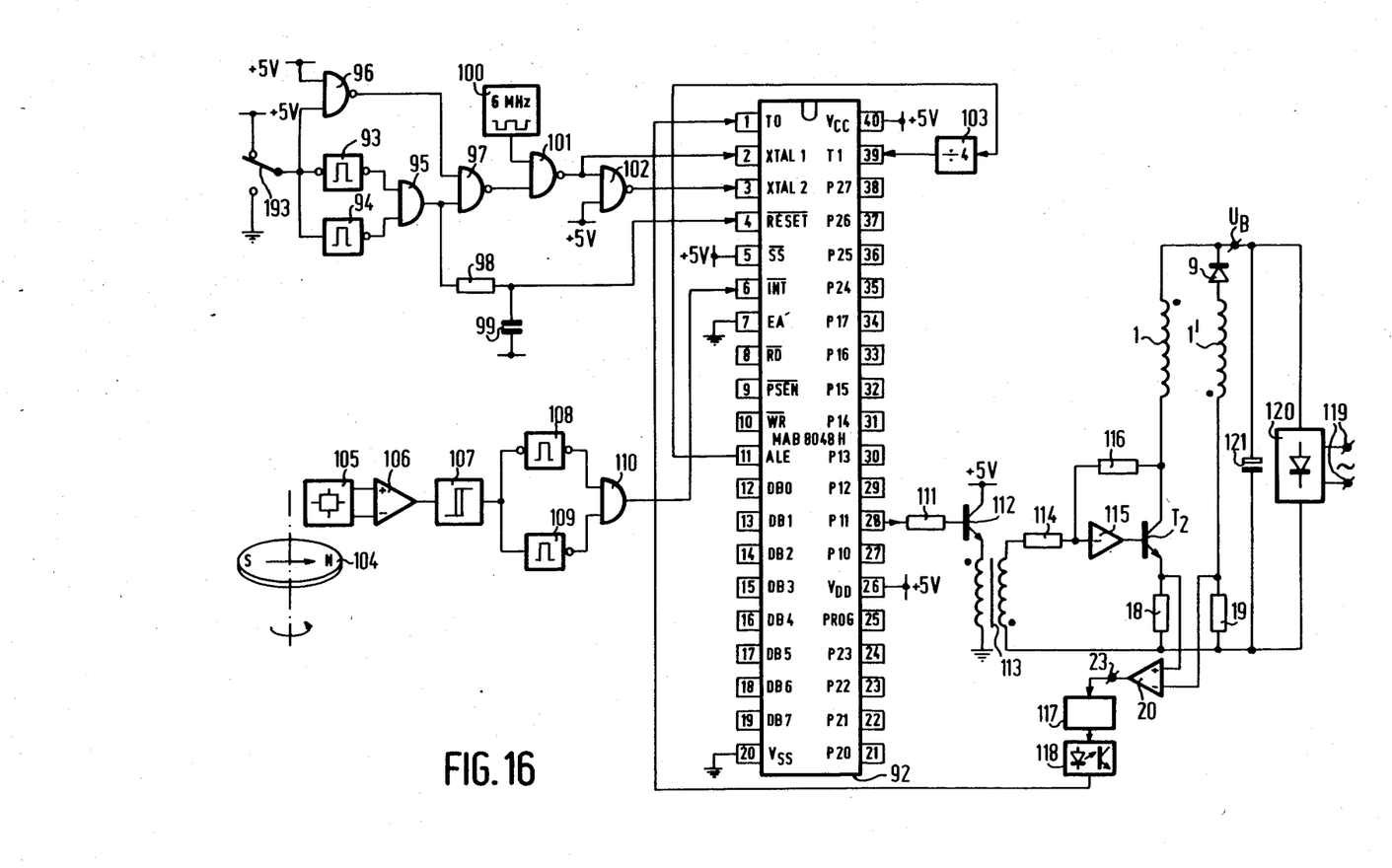
FIG. 16 shows in detail the circuit for controlling the single-phase reluctance motor by means of a microprocessor.

FIG. 16 shows a preferred embodiment of the invention in which the single-phase reluctance motor is controlled by a microprocessor type number MAB 8048 H described in the PHILIPS DATA HANDBOOK Part IC 11, 1983, pages 317–342. Here, the microprocessor 92 is shown with the same pin numbers and pin assignment as in the said handbook.

Figure 17:
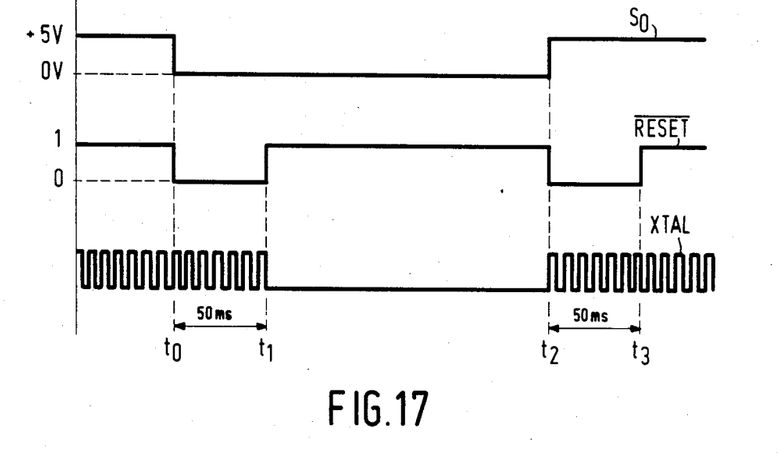
FIG. 17 shows some diagrams illustrating the operation of a part of the control circuit shown in FIG. 16

The control system is started and stopped by means of a switch 193. The microprocessor is stopped by interrupting the supply of clock pulses to pins 2 and 3, designated "XTAL 1" and "XTAL 2". In order to stop the processor in a state in which U=1 (switch open) and in order to ensure that it is started in a correct initial state, a reset pulse of at least 50 msecs, designated "$\overline{RESET}$", must be produced on pin 4 during starting and stopping, during which pulse the clock signal must be present. FIG. 17 shows the signals $\overline{RESET}$ and XTAL 1 (=$\overline{XTAL\ 2}$) as a function of the position $S_o$ of switch 193. At an instant $t_o$ the switch is connected to ground ($S_o=OV$). The clock signal remains present, and the $\overline{RESET}$ signal becomes zero until the instant $t_1$, which occurs 50 ms later. At this instant the clock signal is interrupted. Upon switching on at the instant $t_2$ a 50 ms reset pulse is supplied and the clock signal is applied and at instant $t_3$ the reset pulse is terminated, which ensures that the processor is in its correct initial condition. In the embodiment shown in FIG. 16 the said signals are obtained in that switch 193 is connected to a monostable circuit 94, which has an inverting output and which supplies a 50-msec pulse, and to the inverting input of a similar pulse shaper 93. The inverting outputs of the two pulse shapers are connected to an AND-gate 95 on whose output the inverted reset signal appears, which signal is applied to pin 4 of the microprocessor via an RC-filter 98, 99. The switch is also connected to a NAND-gate 96 to which moreover +5 V is applied so that this gate generates a logic 1 when switch 193 is connected to ground ("OFF" state). The output signal of this gate 96 and the output signal of gate 95 are applied to a NAND gate 97 on whose output a logic one appears when the reset pulse is present and switch 193 is in the "ON" state, during which state the switch is connected to +5 V. Subsequently, this signal is combined with a clock signal (6 MHz) from a source 100 by means of a NAND-gate 101, on whose output the desired clock signal is obtained, which signal is applied to pin 2 (XTAL 1) and to pin 3 (XTAL 2) after inversion by means of gate 102.

For the power supply and bias of the microprocessor pins 5, 26 and 40 are connected to +5 V and pins 7 and 20 to ground. The "ALE" output (pin 11) is connected to input $T_1$ (pin 39) via a divide-by-four circuit 103 in order to provide a clock signal for the interrupt timer $t_{int}$.

An interrupt signal for pin 6 ("INT") is obtained by means of a rotor-position sensor which in the present example comprises a diametrically magnetized disc 104 which is coupled to the rotor shaft in such a way that a predetermined relationship with the rotor position is established in order to ensure a predetermined relationship between the rotor position and the appearance of an interrupt pulse. Preferably, the pulse is generated when the rotor is in line with the stator poles.

The magnetic disc 104 cooperates with a magnetic-field sensor, in the present case a Hall element 105, whose output signal is applied, via an amplifier 106 and a comparator 107, to the inverting input of a 28 $\mu$s pulse shaper or monostable 108 and the non-inverting input of a similar pulse shaper 109. The inverting outputs are combined by means of an AND-gate 110 to produce a signal normally with a logic level 1 but which exhibits the logic zero level with a duration of 28 $\mu$s each time that the Hall element 105 detects a north-south and a south-north transition (i.e. two times for each revolution of the rotor of the motor). This signal is applied to the inverting interrupt input "INT" (pin 6) to form interrupt pulses which have suitable lengths but which are shorter than the execution time of the INTERRUPT subroutine.

Pin 28 ("P11") is used as an output for the signal $S_F$ (=parameter U in the flow chart). Via a resistor 111 this pin is connected to a transistor 112 which drives an inverting amplifier 115 via an isolating transformer 113 and a resistor 114. The amplifier 115 controls the switching transistor $T_2$ which is connected in the same way as shown in FIG. 4. Positive feedback is applied to the combination of the inverting amplifier 115 and the switching transistor T₂ via a resistor 116, so that the state of conduction of transistor T₂ is changed over under command of the signal transferred by the isolating transformer 113. The signal $S_F$ is subjected to a high-pass filtration so that only short positive and negative pulses are transferred on the positive and negative edges of the signal $S_F$.

The output 23 of the excess-current detector (see also FIG. 4) is connected to a comparator 117 which is connected to pin 1 ("TO") via an optical coupler 118.

The motor voltage $U_B$ is derived from an alternating voltage on input 119 by means of a rectifier bridge 120 and a smoothing capacitor 121.

As already described for the embodiment shown in FIG. 5, it is possible to provide a facility for selecting from a plurality of torque-speed curves, for example 2. In the microprocessor version this is possible by setting a parameter P(P:=0; 1) in the main program (FIG. 7) during initialization after block 42, which parameter indicates the desired speed-torque curve (block 122). In the TABLE subroutine (FIG. 8) this parameter is then tested after the starting block 60 in a block 123 and, as the case may be, depending on this parameter P the program proceeds to other search blocks 124 and 125 instead of the search blocks 61 and 62. It is also possible to provide more than two selection possibilities.

Figure 18:
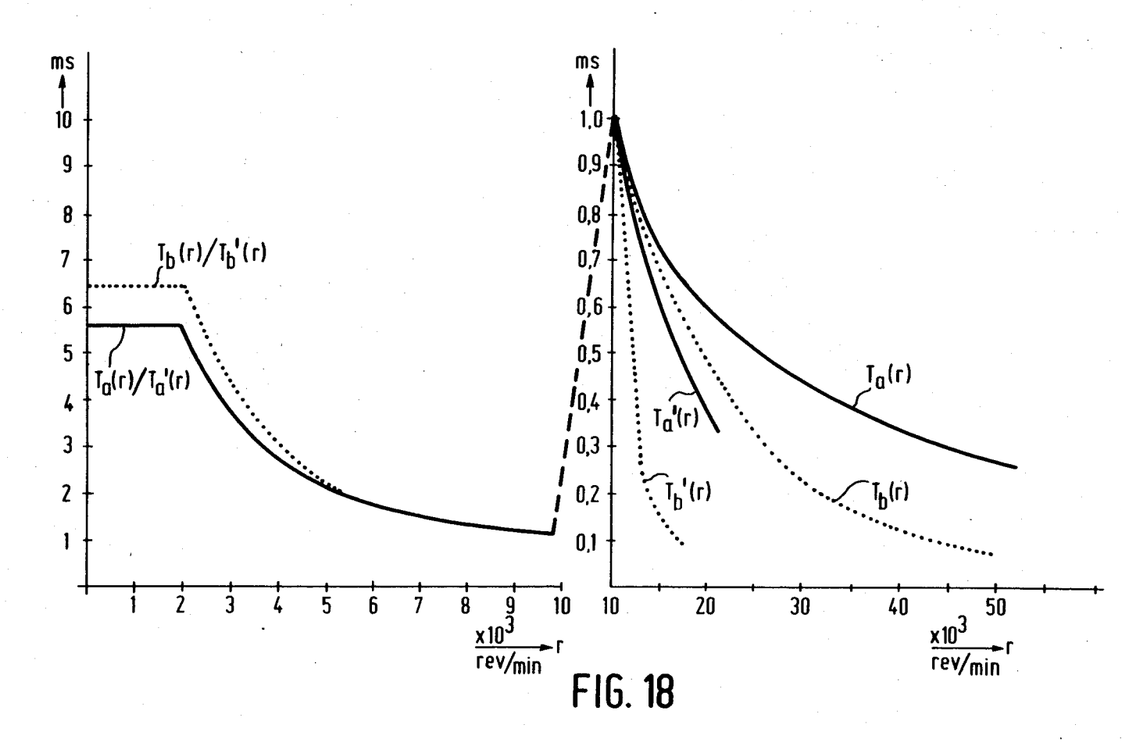
FIG. 18 shows the time intervals $T_a$ and $T_b$ as a function of the speed in a particular embodiment of the invention.

FIG. 18 shows the parameters $T_a$ and $T_b$ as a function of the speed r for two torque-speed curves, one with the parameters $T_a(r)$ and $T_b(r)$ and the other with the parameters $T_a'(r)$ and $T_b'(r)$. For both curves the starting portion up to 10,000 revolutions per minute is identical. Above 10,000 revolutions per minute the values for $T_a'(r)$ and $T_b'(r)$ decrease very rapidly so that the operating point of the control system will be situated in the range from 10,000 to 20,000 revolutions/minute depending on the position of a load line. The values for $T_a(r)$ and $T_b(r)$ decrease far more slowly so that the operating point will be situated at speeds of approximately 50,000 revolutions per minute when these parameters are employed. The invention may be used, for example, in a kitchen machine which has high speeds with a low load, for example, for mixing and low speeds with a high load, for example, for kneading dough.

What is claimed is:

1. A single-phase reluctance motor having a stator with an excitation coil and an iron rotor constructed such that the flux which is coupled to the excitation coil depends on the rotor position, comprising
   permanent magnet means for obtaining a preferential stationary position from which starting in a desired direction is possible,
   a position sensor for generating position pulses at diametrically opposite rotor positions,
   a switch for energizing the excitation coil under command of energizing pulses,
   means for generating a first energizing pulse of predetermined length in order to start the motor,
   means for generating at least a second energizing pulse after the appearance of the first position pulse during starting, which pulse starts a predetermined time interval after the appearance of said position pulse and has a predetermined length,
   means for determining the time interval between consecutive position pulses,
   means for determining, after starting, a measure of a first and a second time interval as a function of the time intervals measured between consecutive position pulses, and
   means for supplying energizing pulses which each start when the first time interval has elapsed after the appearance of a respective position pulse and which are each sustained for the second time interval.

2. A single-phase reluctance motor as claimed in claim 1, further comprising a motor-current sensor for detecting the current through the excitation coil and generating a signal when said current exceeds a predetermined value, and means for opening the switch for a predetermined time under command of said signal.

3. A single-phase reluctance motor as claimed in claim 1, characterized in that the motor is constructed to return field energy stored in the excitation coil to the power supply when the switch is open.

4. A single-phase reluctance motor as claimed in claim 3, further comprising an energy-recovery coil connected in series with a diode, said series arrangement being connected in parallel with the series combination of the excitation coil and the switch, said energy-recovery coil being coupled magnetically to the excitation coil in an opposite sense so that, after the switch has been opened, current will flow in the energy-recovery coil in a direction opposite to the direction of the current in the excitation coil before the switch was opened.

5. A single-phase reluctance motor as claimed in claim 4 wherein said means comprise a microprocessor and the position sensor is coupled to an interrupt input of the microprocessor.

6. A single-phase reluctance motor as claimed in claim 5, characterized by a first program step in which a signal on the interrupt input is awaited for a predetermined time in order to ascertain whether or not the rotor rotates and to generate said first and second energizing pulses if the rotor does not rotate.

7. A single-phase reluctance motor as claimed in claim 6, characterized by a program step which ascertains whether the time which has elapsed after the appearance of a signal on the interrupt input is longer than a predetermined time in order to generate said first and second energizing pulses if said time is longer.

8. A single-phase reluctance motor as claimed in claim 5, characterized in that in the microprocessor program a flag is set as a function of the position in the program in order to mark at least that period in the program where the appearance of a signal on the interrupt input is anticipated, which flag is tested after every occurrence of a signal on the interrupt input.

9. A single-phase reluctance motor as claimed in claim 5, characterized by a program step in which the occurrence of a signal on the interrupt input while the switch is closed is detected in order to reduce the value of said second time interval.

10. A single-phase reluctance motor as claimed in claim 1, characterized in that said means for determining, after starting, the first and the second time intervals as a function of the time intervals measured between consecutive position pulses comprise selection means for selecting between at least a first function, in which the first and the second time intervals decrease as a function of the speed or the inverse of the time intervals measured, and a second function in which said first and second time intervals decrease more rapidly as a function of the speed.

11. A single-phase reluctance motor as claimed in claim 2 wherein the motor includes means for returning field energy stored in the excitation coil to the power supply when the switch is open.

12. A single-phase motor as claimed in claim 11 wherein the excitation coil and the switch are connected in a series circuit to said power supply, and said energy returning means comprises, an energy-recovery coil connected in a series arrangement with a diode, means connecting said series arrangement in parallel with said series circuit, said energy-recovery coil being magnetically coupled to the excitation coil in an opposite sense so that, after the switch has been opened, current will flow in the energy-recovery coil in a direction opposite to the direction of current in the excitation coil before the switch was opened.

13. A single-phase reluctance motor as claimed in claim 1 wherein said means comprise a microprocessor having an interrupt input coupled to the position sensor, said microprocessor providing a first program step wherein a signal at the interrupt input is awaited for a predetermined time so as to determine whether or not the rotor is rotating and to generate said first and second energizing pulses if the rotor is not rotating, said microprocessor further providing a program step which determines whether the elapsed time after the receipt of a signal at the interrupt input exceeds a predetermined time thereby to generate said first and second energizing pulses if said elapsed time is longer than the predetermined time.

14. A Single-phase reluctance motor as claimed in claim 1 wherein the microprocessor provides a program step wherein the occurrence of a signal at the interrupt input while the switch is closed is detected to cause the length of said second time interval to be reduced.

* * * * *